June 13, 1967 J. R. HARRIS ETAL 3,325,285

METHOD OF GRAVURE REPRODUCTION

Filed Nov. 9, 1962 2 Sheets-Sheet 1

INVENTORS
JEROME R. HARRIS
BY WALTER M. THODE

Ward, Neal, Haselton, Orme & McElhannon
ATTORNEYS

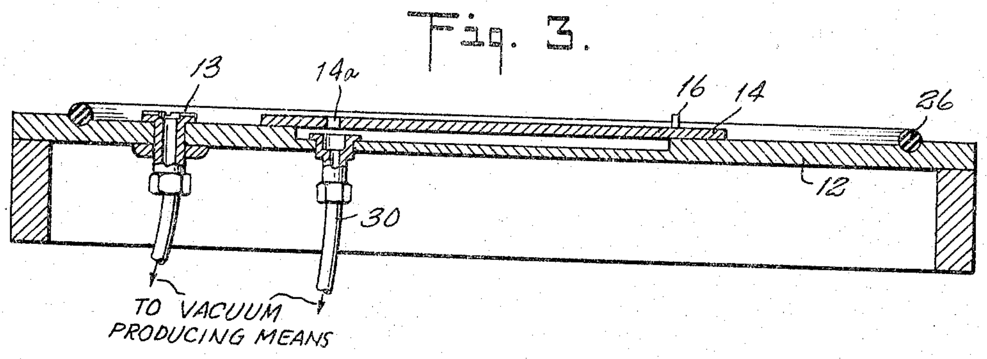
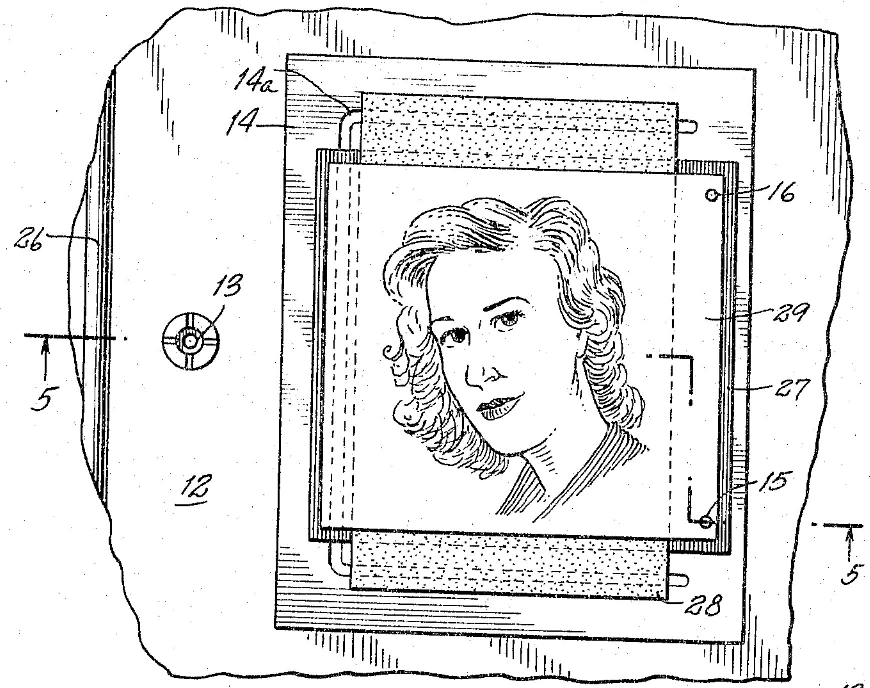
Fig. 4.
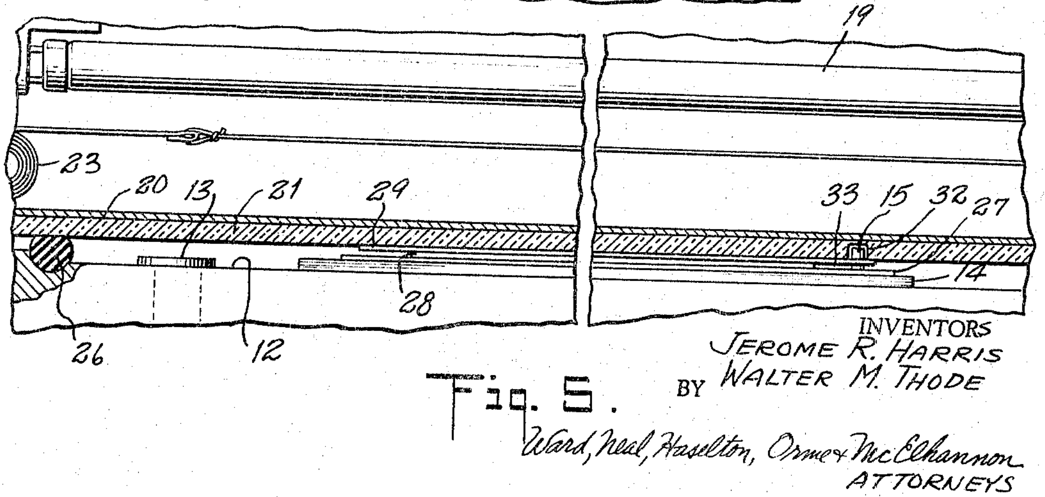
Fig. 5.
INVENTORS
JEROME R. HARRIS
WALTER M. THODE
BY
Ward, Neal, Haselton, Orme & McElhannon
ATTORNEYS

United States Patent Office 3,325,285
Patented June 13, 1967

3,325,285

METHOD OF GRAVURE REPRODUCTION

Jerome R. Harris, North Plainfield, and Walter M. Thode, Plainfield, N.J., assignors to Art Color Printing Company, New York, N.Y., a corporation of New York Filed Nov. 9, 1962, Ser. No. 239,099
3 Claims. (Cl. 96—38)

This invention relates to apparatus and methods for producing printing plates or cylinders and relates particularly to photogravure processes known as half tone and intaglio half tone processes.

In many well known printing processes, metal plates or cylinders are prepared which have either very small raised dots or very small recesses of varying size or depth, or both, corresponding to the tone of the material to be printed. To produce such plates or cylinders it is customary to apply to the surfaces thereof a resist material, such as a carbon resist, or a gravure resist film, such as the film sold by E. I. du Pont de Nemours & Co., Parlin, New Jersey, under the name "Rotofilm," which has previously been exposed to light through a transparent film or plate bearing the image to be reproduced and a screen, or through a transparent screen film or plate bearing the image and screen lines, the film or plate being a negative or positive depending upon the type of plate or cylinder desired. The plate or cylinder with the resist thereon is etched in a well known manner with known solutions to produce the raised dots or the recesses which are distributed in accordance with the tone values of the subject on the transparent film or plate, called a transparency, to which the resist has been exposed. Thereafter, the treated plate or cylinder may be inked and used to reproduce on paper or other material the subject matter of the transparency.

In preparing the transparency to which the resist is exposed, several steps usually are required and several intermediate transparencies are prepared. For example, in the intaglio rotogravure process, it is customary to perform the following steps:

(1) An unscreened, continuous tone negative is made in a process camera from the non-transparent or opaque continuous tone reflective copy to be reproduced.

(2) A continuous tone positive is prepared from the negative and retouched, if necessary.

(3) A line screen negative is prepared from the retouched positive either by use of a camera or separate exposure of the negative to light through a screen and then to the positive.

(4) The line screen negative so produced is then retouched as required and one particular problem is the removal of unwanted dots in the highlight or white areas.

(5) The screen positive is prepared by exposure to the screen negative. The screen positive is thereafter used, either alone or in conjunction with the continuous tone positive, for the exposure of the resist.

In another known process the steps are as set forth above except that the line screen negative and positive are not prepared, the resist being exposed to the continuous tone positive and to a light source through a suitable screen.

It will be apparent from the foregoing that in both of the conventional processes a substantial number of steps are required and they must be performed by relatively skilled operators, particularly in connection with the removal of unwanted dots corresponding to highlight or white areas.

Certain processes and apparatus have been developed for improving the quality of the printed matter produced with certain savings in labor and time. For example, reference is made to the processes disclosed in Patent No. 2,997,392 and the screened apparatus disclosed in Patent No. 2,703,281. However, while these processes and apparatus produce high quality printing, a substantial amount of skilled labor, as well as special apparatus, is still required.

So-called direct positive or auto-positive film has been developed which permits the making of positive transparencies from positive transparencies, negative transparencies from negative transparencies or negative transparencies from positive transparencies and vice versa. One such type of film is the direct positive clear film manufactured by E. I. du Pont de Nemours & Co., Inc., Wilmington, Del., and sold under the trademark "Cronar." With the use of such film it is possible to eliminate certain steps in conventional processes, such as the intermediate negatives where a positive transparency is required for exposure of the resist or intermediate positives when a negative transparency is required for the exposure of the resist. However, even though these transparencies and their accompanying steps are eliminated, it is still necessary to employ some means for eliminating the unwanted dots in the highlight or white areas if high quality printing is desired.

Certain improvements in the production of printing plates or cylinders have been obtained with the use of co-called contact or "vignetted" screens having a pattern of elements, each element having a density gradient going from a maximum at the center to a minimum at the edges. Thus, the screen is made up of transparent lines separating squares having a high density at the center and a gradually decreasing density from the center to the edges thereof. Such screens are manufactured and sold by the Eastman Kodak Company, Rochester, New York, and are described in the magazine "Gravure" for January 1960, in the Gravure Technical Association Bulletin for September 1961 and in "The American Photo-engraver" for August 1962. Such screens are sometimes known as "gray contact screens" or "magenta contact screens," but for simplicity such screens will be identified in this specification and the appended claims as contact screens or a contact screen.

In the prior art processes, it is conventional to make the various exposures using a light source which is substantially a point source, or, in any event, is not a source comparable in size to the transparencies being exposed or the screen employed for producing the screen effect on the transparency or resist. We have found that by using the above-identified contact screen with a diffused light source comparable in size to the size of the screen, we can produce screened transparencies and a resist with substantially complete control over the dots appearing in the highlight or white areas so that the desired range of density, the standard lower limit for which is .25 but may range from .20 to .35, may be obtained with the elimination of the unwanted dots.

We have further found that by combining the aforementioned process with the use of films of the direct positive type we can produce the desired screened transparency with fewer steps and with a substantial saving in time, labor and materials as compared to the processes of the prior art. For example, it has been found that it has been possible to reduce the materials costs to approximately one-sixth of the materials costs for one prior art process and at the same time reduce the labor costs to approximately one-half.

We have further invented simple, reliable and inexpensive apparatus for performing the process.

The processes and apparatus of the invention may be employed for the production of either intaglio rotogravure printing cylinders or half tone printing plates or cylinders having raised dots and the processes and apparatus have use in other processes employing screen transparencies or resists. In addition, the processes and apparatus of the invention may be employed in producing plates for cylinders for either black and white or multicolor printing, the separate transparencies required for multicolor printing being prepared in the conventional manner but using the processes and apparatus of the invention.

It is one object of the invention to provide processes for producing screened transparencies used to make printing plates or cylinders which are simpler than those of the prior art.

It is a further object of the invention to provide simple and inexpensive apparatus for carrying out the processes of the invention.

Other objects and advantages of the invention will be apparent from the following detailed description of the preferred embodiments thereof, which description should be considered in conjunction with the accompanying drawings in which:

FIG. 3 is a sectional, end elevation view, taken along line 3—3 indicated in FIG. 1, of the lower portion of the apparatus shown in FIG. 1;

FIG. 4 is a fragmentary plan view of the lower portion of the apparatus shown in FIG. 1 showing the films employed in the process in place; and FIG. 5 is a fragmentary, side elevation view, partly in cross-section, of the apparatus shown in FIG. 1 in the closed position and is taken along the line 5—5 indicated in FIG. 4.

Figures 1, 2:
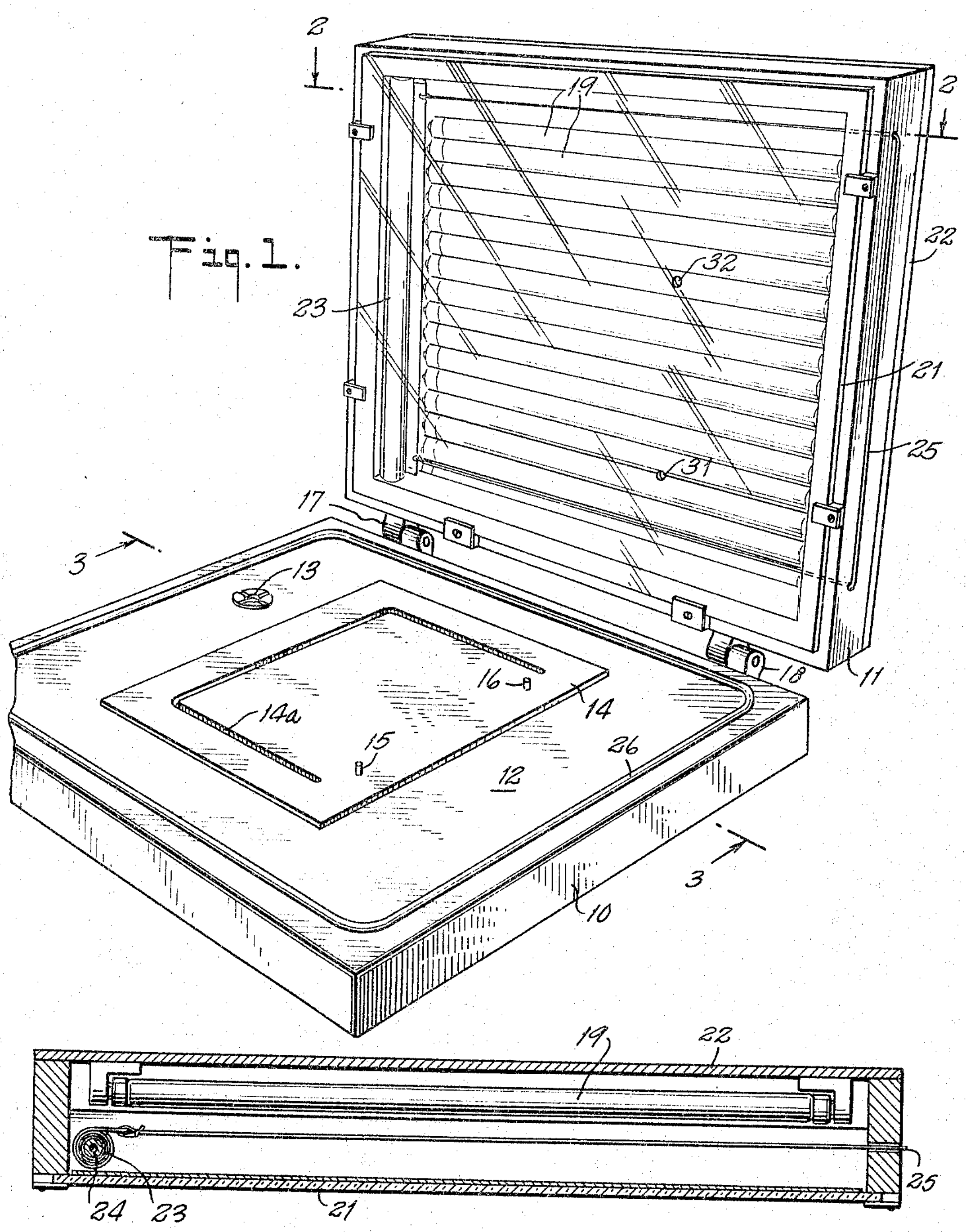
FIG. 1 is a perspective view of the apparatus of the invention in the open position.
FIG. 2 is a sectional, end elevation view, taken along line 2—2 of FIG. 1, of the upper portion of the apparatus shown in FIG. 1.

The preferred embodiment of the apparatus of the invention is illustrated in FIGS. 1–5 and comprises a lower housing 10 and an upper housing 11. On the upper face of the housing 10 is a panel 12 which is impervious to air except at the opening 13 which is connected to vacuum-producing means (not shown). The panel 12 extends around a platen 14 which has a U-shaped slot or aperture 14*a* therein and a pair of locating pins 15 and 16 extending from the face thereof. The panel 12 and the platen 14 are in airtight engagement and the slot or aperture 14*a* is also connected to a vacuum-producing means through a line 30 (FIG. 3).

The upper housing 11 is hingedly connected to the housing 10 by a pair of hinges 17 and 18 so that the housing 11 may be raised to the position shown in FIG. 1 or lowered to the position shown in FIG. 5 so that the housing 11 overlies the housing 10 and hence the platen 14. Conversely, the housing 10 may be raised to the vertical position and have the same relationship to the housing 11.

A plurality of electric lamps 19 may be mounted in the housing 11 in side-by-side relationship so as to provide a substantially uniform diffused light source. Alternatively, the lamps 19 and the cover 22 may be mounted on a fixed vertical support separate from the housing 11 so that the housing 11 may swing to the position shown in FIG. 1 or swing away from the lamps 19. Preferably the lamps 19 are fluorescent lamps but other types of lamps may be employed provided that they are arranged so as to form a uniform, diffused light source. The lamps 19 are selected so as to produce light of a color required for the transparency to be produced as hereinafter described or they may be associated with a filter, such as a filter 20 (FIG. 5), which will permit light of the desired color only to be transmitted through the transparent plate 21, which may be glass or plastic, mounted on the face of the housing 11.

Although exposure of the photosensitive material, which is mounted on the platen 14 as described hereinafter, may be accomplished by energizing the lamps 19 when it is desired to expose the photosensitive material to light, it is preferred that the lamps be energized prior to exposure of the photosensitive material so that the lamps may stabilize. Accordingly, in the preferred embodiment of the invention, a shutter 23, which may be in the form of a flexible opaque sheet material mounted on a spring returned roller 24, is mounted in the housing 11 so that it may be drawn in front of the lamps 19 by means of a string or rope 25. Thus by pulling the string 25, the shutter 23 is drawn in front of the lamps 19 between the lamps 19 and the plate 21 and the lamps 19 are energized. When it is desired to expose the photosensitive material, the string 25 is released for the desired time causing the shutter 23 to assume the position shown in FIGS. 1 and 2 and at the end of the exposure time the string 25 is again pulled, terminating the exposure of the photosensitive material to light.

A gasket 26 of a resilient, air impermeable material, such as rubber, is mounted between the panel 12 and the plate 21 and preferably is secured to the face of the panel 12. When the housings 10 and 11 are brought together, the plate 21 bears against the gasket 26 forming an airtight chamber between the plate 21 and the panel 12 and surrounded by the gasket 26.

As illustrated in FIG. 5, the sheet or film 27 bearing the photosensitive material is placed on the surface of the platen 14 with the emulsion or photosensitive material facing upwardly and away from the platen 14. The sheet 27 has a pair of apertures therein for receiving the pins 15 and 16.

The contact screen 28, preferably with the emulsion side thereof facing toward the sheet 27, is placed over the sheet 27 with the ends thereof overlying the end portions of the slots 14*a*. During one of the exposures of the photosensitive material on the sheet 27 the transparent sheet or plate 29 bearing the image to be reproduced is omitted and the contact screen 28, as well as the sheet 27, are maintained in place by virtue of the vacuum produced through the line 30 (FIG. 3). The plate 21 has a pair of apertures 31 and 32 therein for receiving the pins 15 and 16, and although the apertures 31 and 32 do not extend through the thickness of the plate 21, they are of sufficient depth to permit the face of the plate 21 to bear against the upper surface of the screen 28, pressing the screen 28 against the sheet 27. During such exposure, the space between the plate 21 and the panel 12 is evacuated through the opening 13 to make certain that air is removed from between the sheet 27 and the screen 28.

After the first exposure is completed, the evacuation of the space between the plate 21 and the panel 12 is discontinued, but the evacuation of air through the slot 14*a* is continued so as to maintain the screen 28 in a fixed position on top of the sheet 27. The housings 10 and 11 are separated so as to permit placement of the sheet or plate 29 on top of the screen 28 preferably with the emulsion side of the sheet 29 facing the screen 28. The sheet or plate 29 has a rigid strap 33 attached to one end thereof and this strap 33, as well as the end of the sheet 29, are provided with apertures for receiving the pins 15 and 16. When the sheet 29 is in the position shown in FIG. 5, the housings 10 and 11 are again brought together so that the face of the plate 21 bears against the upper surface of the sheet 29 pressing the sheet 29, the contact screen 28 and the sheet 27 together. The space between the plate 21 and the panel 12 is again evacuated and thereafter the sheet 27 is again exposed to the light from the lamps 19 through the image-bearing sheet 29 and the contact screen 28.

Although it is preferred that the sheet 27 be first exposed to the light from the lamps 19 through the contact screen 28 without the presence of the sheet or plate 29 and subsequently be exposed to light from the lamps 19 through the sheet or plate 29 and the contact screen 28 if the sheet 29 is a positive and the sheet 27 is a direct positive film, the steps may be performed in the reverse order, if desired. For half-tone processes exposure in the reverse order is preferred.

The methods or processes of the invention may be employed as part of, and in place of certain steps of, the conventional methods or processes employed to produce printing plates or cylinders for either black and white or multicolor printing and having raised or recessed dot areas corresponding in density or size to the tone areas of the image to be reproduced. Thus, for example, the processes of the invention may be used to provide an intermediate screen positive or negative to which a resist is exposed or the resist itself may be exposed in the apparatus of the invention. The methods of producing the other positives or negatives required and of developing the resist and etching the plate or cylinder are the same as those now used in the art.

In accordance with the invention, a screen image is produced on the desired photosensitive material, such as a positive or negative transparency or a resist, using the contact screen of the type described above and a uniform, diffused light source of an area comparable to the area of the screen and the following steps:

(1) Exposure of the photosensitive material to such source through such screen to produce an image of the screen on the material.

(2) Exposure of the photosensitive material to such source through a transparency bearing the image to be printed and through such screen to produce dots on the photosensitive material varying in density and size in accordance with the tones of said image but with substantially no dots in areas corresponding to image low density areas for a positive and with dense dots separated substantially only by wall lines in areas corresponding to image low density areas for a negative.

The foregoing steps 1 and 2 may be performed in any order, that is, step 1 may be performed before step 2 and vice versa. The process of the invention may be employed to produce a screen positive transparency from a tone positive or negative transparency, a screen negative transparency from a tone positive or negative transparency, or a screen and subject image bearing resist from a tone positive or negative transparency.

The standard range of density for a screened image is from .25 to 1.55 but the lower limit may vary from .20 to .35. Thus it is desired to have a drop-out or absence of dots when the density is below about .25. In many prior art processes the unwanted dots are eliminated by hand either by retouching of a transparency or operations on the plate or cylinder.

It has been found that if step No. 2 above described is performed using a conventional light source, for example a lamp or arc lights, the light source areas of which are not comparable to the area of the contact screen or the transparency having the subject to be reproduced thereon, unwanted dots appear on the exposed and developed material in areas having densities less than .25. However, when the uniformed, diffused light source described above is used, the exposure time can be selected so as to achieve a drop-out or elimination of dots in areas where such dots are unwanted, such as in the highlight or white areas. Thus the exposure time is selected so that the dots are eliminated in areas where the density is less than the predetermined lower density limit, i.e., .25 or in the range from .20 to .35. With the exposure time so selected, the desired range of dot densities and sizes may be still obtained for the remaining areas. Accordingly, in the processes of the invention, a contact screen and a uniform, diffused light source comparable in area to the area of the subject matter to be reproduced, and preferably of an area at least coextensive with the area of such subject matter, are employed.

While the reason or theory for the elimination of the unwanted dots is not exactly known, it is believed that because of the nature of the contact screen and the use of the uniform, diffused light source comparable in area to the area of the screen or the area of the subject matter to be reproduced, the light passing through the contact screen from several angles eliminates unwanted dots in low density areas with properly selected exposure times by an undercutting effect.

Although the screen 28 and the sheet or plate 29 may be otherwise disposed, it is preferred that the emulsion sides thereof be as close as possible to the emulsion side of the sheet 27 to prevent undesired undercutting of wanted dots and lines.

The following typical processes preferred for producing intaglio gravure printing plates or cylinders will further illustrate the use of the processes of the invention.

*Example 1.—Black and white printing*

(1) Prepare a tone positive transparency 29 of the subject to be reproduced in accordance with conventional methods.

(2) Since a screen positive is to be prepared, use a direct positive film, such as the Du Pont "Cronar" film described hereinbefore, as the sheet 27, placing it emulsion side up in the apparatus of the invention as shown in FIG. 5.

(3) Place a contact screen 28 of the type described hereinbefore over the sheet 27 with the emulsion side down and apply a vacuum to the slot 14*a* to hold sheet 27 and screen 28 in place.

(4) In order that a positive may be produced using the film described for the sheet 27, green light and the elimination of blue light is required. Accordingly, the lamps 19 in the apparatus of the invention may be green fluorescent lamps with built in reflectors and of the type manufactured and sold by General Electric Company, Schenectady, New York, under type No. FR22–T 8–G6 and the filter 20 may be a yellow filter such as the type DP 480 amber sheeting manufactured by E. I. du Pont de Nemours & Co. Inc., Wilmington, Delaware. The filter 20 preferably passes wavelengths longer than about 520 millimicrons with little attenuation and substantially blocks wavelengths shorter than about 470 millimicrons.

(5) Move housings 10 and 11 into parallel relationship and so that the plate 21 engages the gasket 26 and presses against the upper surface of the screen 28 and apply a vacuum through the opening 13 so as to remove substantially all air from between the screen 28 and the sheet 27.

(6) Expose the sheet 27 to light from the lamps 19 for substantially 60 seconds.

(7) Release the vacuum applied through the opening 13 but maintain the application of vacuum to the slot 14*a* and separate the housings 10 and 11.

(8) Place the tone positive transparency 29 in the position shown in FIG. 5 and hence on top of the screen 28 with the emulsion side of the transparency 29 facing downwardly. Preferably the transparency 29 has a strap 33 attached thereto with apertures in the strap 33 and the transparency 29 which register with the pins 15 and 16.

(9) Again place the housings 10 and 11 in parallel relationship with the plate 21 in engagement with the gasket 26 and pressing against the transparency 29 and apply vacuum through the opening 13 so as to remove substantially all air from between the faces of the sheet 27, contact screen 28 and transparency 29.

(10) Expose the sheet 27 to light from the lamps 19 for substantially 4¼ minutes.

(11) Release the vacuum applied through the opening 13, separate the housings 10 and 11 and remove the transparency 29, the contact screen 28 and the sheet 27. Develop the sheet 27 in a conventional manner in a line developer.

(12) Expose a resist to light through the sheet 27, and if desired through the tone positive 29 in register, in a conventional manner and develop the resist in a conventional manner.

(13) Employ the so developed resist in a conventional manner to prepare a gravure plate or cylinder.

The foregoing exposure times of the preferred process are representative only and may be varied in the manner well known to those skilled in the art depending upon the density of the tone positive transparency, the effects desired in the resulting screen positive, the film employed for the sheet 27 and the developing conditions. If a negative transparency is used as the sheet 27, then the lamps 19 and the filter 20 are selected in a conventional manner to provide the desired color of light. For intaglio gravure a screen positive would be prepared from the screen negative resulting at step 11 above and such screen positive would be employed in step 12 above.

If desired, a photosensitive resist material, such as the resist film sold under the name "Rotofilm" and identified above, may be substituted for the sheet 27 and the lamps 19 and the filter would be selected to provide the proper color of light. In addition, step 12 would be omitted.

*Example 2.—Color printing*

(1) Prepare the conventional black, cyan, magenta and yellow tone positive transparencies in the conventional manner.

(2) Use each of the tone positive transparencies as the sheet 29 and process each in accordance with steps 2 through 13 set forth under Example 1 but using the following exposure times:

Black—same as steps 6 and 10 of Example 1.
Cyan—substantially 53 seconds for step 6 and substantially 3¼ minutes for step 10.
Magenta—substantially 55 seconds for step 6 and substantially 3½ minutes for step 10.
Yellow—same as for magenta.

Having thus described our invention with particular reference to the preferred form thereof and having shown and described certain modifications, it will be obvious to those skilled in the art to which the invention pertains, after understanding our invention, that various changes and other modifications may be made therein without departing from the spirit and scope of our invention, as defined by the claims appended thereto.

What is claimed as new and desired to be secured by Letters Patent is:

1. A method for producing a positive screened dot image of a subject on a transparent, direct positive film from a tone positive transparency bearing said subject comprising exposing said film once to a uniform, diffused light source at least as large as the area of said subject through a contact screen and once to said source through said contact screen and said transparency, said contact screen having the same lateral position with respect to said film during both exposures, whereby dots are eliminated from said positive screened dot image in areas having densities less than approximately 0.25.

2. In a method for producing an intaglio rotogravure cylinder which comprises making a tone positive transparency of the subject to be reproduced and etching the cylinder by means of a resist, the steps of exposing a transparent, direct positive film to a uniform, diffused light source at least as large as the area of said subject through a contact screen, exposing said film to said source through said contact screen and said transparency, developing said film whereby said developed film is free of dots in areas having densities less than approximately 0.25, and exposing said resist to light through said developed film.

3. A method for producing a positive screened dot image of a subject on a transparent, direct positive film from a tone positive transparency bearing said subject and extraneous visual matter comprising exposing said film once to a uniform, diffused light source at least as large as the area of said subject through a contact screen in intimate contact with said film and once to said source through said contact screen and said transparency with said screen in intimate contact with said film and said transparency, said contact screen having the same lateral position with respect to said film during both exposures whereby dots are eliminated from said positive screened dot image in areas having densities less than approximately 0.25.

References Cited

UNITED STATES PATENTS

| | | | |
|---|---|---|---|
| 2,587,084 | 2/1952 | Anderson | 95—76 |
| 2,691,580 | 10/1954 | Howe | 96—45 |
| 2,726,587 | 12/1955 | Bartley | 96—27 X |
| 2,731,346 | 1/1956 | Gresham | 96—45 |
| 2,814,975 | 12/1957 | Mears | 95—76 |
| 2,857,273 | 10/1958 | Landow | 96—27 |
| 2,907,657 | 10/1959 | Kott | 96—45 X |
| 2,912,325 | 11/1959 | Maurer | 96—45 X |
| 2,914,405 | 11/1959 | Consaul et al. | 96—38 |
| 2,961,315 | 11/1960 | Sterling | 96—45 |
| 2,984,566 | 5/1961 | Caine | 96—45 |
| 3,082,669 | 3/1963 | Jones | 95—74 |
| 3,122,436 | 2/1964 | Wattier | 96—45 |

FOREIGN PATENTS

| | | |
|---|---|---|
| 773,484 | 4/1957 | Great Britain. |

NORMAN G. TORCHIN, *Primary Examiner.*

A. D. RICCI, R. H. SMITH, *Assistant Examiners.*